US012552148B2

(12) United States Patent
Moreau

(10) Patent No.: US 12,552,148 B2
(45) Date of Patent: Feb. 17, 2026

(54) LAMINATION MODULE FOR A CARD PROCESSING MACHINE INCLUDING A SYSTEM FOR ASSISTING WITH PEELING OF A TRANSFER FILM

(71) Applicant: Evolis SAS, Beaucouze (FR)

(72) Inventor: Ludovic Moreau, Bouchemaine (FR)

(73) Assignee: Evolis SAS, Beaucouze (FR)

( * ) Notice: Subject to any disclaimer, the term of this patent is extended or adjusted under 35 U.S.C. 154(b) by 81 days.

(21) Appl. No.: 18/665,646

(22) Filed: May 16, 2024

(65) Prior Publication Data
US 2025/0018704 A1    Jan. 16, 2025

(30) Foreign Application Priority Data

Jul. 10, 2023 (FR) ...................................... 2307373

(51) Int. Cl.
*B32B 37/00* (2006.01)
*B32B 37/06* (2006.01)
*B32B 37/10* (2006.01)

(52) U.S. Cl.
CPC ........ *B32B 37/0053* (2013.01); *B32B 37/025* (2013.01); *B32B 37/06* (2013.01); *B32B 37/10* (2013.01); *B32B 2425/00* (2013.01)

(58) Field of Classification Search
CPC ............ B32B 2425/00; B32B 37/0053; B32B 37/025; B32B 37/06; B32B 37/10; B32B 38/10; B32B 38/145
See application file for complete search history.

(56) References Cited

U.S. PATENT DOCUMENTS

2015/0217549 A1    8/2015 Rieck et al.
2025/0018704 A1*   1/2025 Moreau ................. B32B 38/145

FOREIGN PATENT DOCUMENTS

EP    3321093    5/2018
EP    3268221    2/2019

OTHER PUBLICATIONS

"European Application Serial No. 24186955.1, Extended European Search Report mailed Dec. 2, 2024", 6 pgs.

* cited by examiner

Primary Examiner — Sonya M Sengupta
(74) Attorney, Agent, or Firm — Schwegman Lundberg & Woessner, P.A.

(57) ABSTRACT

A lamination module for a plastic card processing machine which includes a heating roll, an anvil roll against the heating roll, a transfer film, and a peeling system downstream of the heating roll and including a peeling roll and a wedge extending along said peeling roll, where the wedge is between the heating roll and the peeling roll, where the peeling roll is movable between a constraint position in which the wedge pinches the transfer film against the plastic card and a release position in which the wedge does not pinch the transfer film against the plastic card.

9 Claims, 6 Drawing Sheets

LAMINATION MODULE FOR A CARD PROCESSING MACHINE INCLUDING A SYSTEM FOR ASSISTING WITH PEELING OF A TRANSFER FILM

CROSS-REFERENCE TO RELATED APPLICATION(S)

This application claims priority to French Patent Appl. No. FR2307373, filed Jul. 10, 2023, which is incorporated herein by reference in its entirety.

TECHNICAL FIELD

The present invention relates to a lamination module for a card processing machine where the lamination module includes a system for assisting in peeling a transfer film from the card after printing and lamination, as well as a processing machine including such a lamination module.

BACKGROUND

There are processing machines that are intended to process plastic cards, like bank cards. For example, such a processing machine consists of a printer which prints a pattern on the card. Printing is performed by thermal transfer and the processing machine includes:
- a feeding system which allows feeding the printer with a blank plastic card,
- an ejection system which allows ejecting each plastic card from the printer after printing, and
- between the feeding system and the ejection system, a printing module for printing the patterns on a transfer film and a lamination module for transferring the patterns from the transfer film onto the plastic card.

The printing module ensures the transfer of ink areas, corresponding to the patterns to be printed on the plastic card, onto a transfer film carrying a varnish.

The lamination module includes:
- a feeding roll on which a transfer film carrying a varnish is wound,
- a recovery roll on which the transfer film is wound after the ink and the varnish have been applied over the plastic card, and
- a heating roll which ensures the transfer of the ink areas of the transfer film onto the plastic card.

The transfer film is positioned between the plastic card and the heating roll.

Printing a plastic card consists in firstly covering the varnish of the transfer film with ink areas representative of patterns to be printed, between the feeding roll and the heating roll. Once the ink areas are on the transfer film, the latter passes at the level of the lamination module between the plastic card and the heating roll, which ensures the transfer of the ink areas and of the varnish onto the plastic card. Gradually, the plastic card and the transfer film advance simultaneously under the heating roll in order to print the plastic card, and the transfer film gradually winds up on the recovery roll. Heating the transfer film might cause a slight sticking of the transfer film onto the card, and when the transfer film separates from the card by pulling the film by the recovery roll, it might happen that peeling is not properly performed and traces might then appear on the card.

DISCLOSURE OF THE INVENTION

An object of the present invention is to propose a lamination module for a card processing machine where the lamination module includes a system for assisting in peeling a transfer film from the card after lamination. To this end, a lamination module is provided for a plastic card processing machine, said lamination module including:
- a frame,
- movement systems arranged so as to move a plastic card according to a so-called lamination direction,
- a heating roll,
- an anvil roll arranged against the heating roll and arranged so as to ensure pinching of a plastic card between the anvil roll and the heating roll,
- a transfer film including areas covered with a product to be deposited over the plastic card,
- a feeding and recovery system arranged so as to move the transfer film between the plastic card and the heating roll according to the lamination direction,
- a peeling system arranged downstream of the heating roll and including a peeling roll and a wedge secured to the peeling roll and extending along said peeling roll, where the wedge is between the heating roll and the peeling roll, where the peeling roll is movable between a constraint position in which the wedge pinches the transfer film against the plastic card and a release position in which the wedge does not pinch the transfer film against the plastic card, and
- a drive system arranged so as to move the peeling roll from the release position to the constraint position and vice versa.

Advantageously, the movement of the peeling roll between the release position and the constraint position is a rotation about its axis.

Advantageously, the peeling system includes a return spring which tends to return the peeling roll from the constraint position to the release position when the peeling roll is brought away from the release position.

Advantageously, the lamination module includes a peeling anvil roll which faces the peeling roll so that the plastic card is pinched between the peeling anvil roll and the wedge when the peeling roll is in a constraint position.

Advantageously, the lamination module includes a lifting system ensuring the movement of the heating roll alternately from a lowered position in which the heating roll bears against the anvil roll to a raised position in which the heating roll is at distance from the anvil roll.

Advantageously, the lifting system includes:
- a first carrier frame mounted movable in rotation about an axis of rotation,
- a second carrier frame mounted movable in rotation about the axis of rotation,
- at least one first spring element mounted between the first carrier frame and the second carrier frame so as to separate them from each other,
- at least one second spring element mounted between the frame and the second carrier frame so as to raise said second carrier frame,
- at least one cam mounted movable in rotation about a cam axis parallel to the axis of rotation, where the cam has a first profile, where, for each cam, the second carrier frame has a first cam path, and
- a drive means arranged so as to move the or each cam in rotation about the cam axis, where, in a first direction of rotation of the or each cam, the or each first profile cooperates with a first cam path to lower the second carrier frame and where, in a second direction of rotation of the or each cam, the or each first profile cooperates with the first cam path to release the second carrier frame.

Advantageously, each cam has a second profile, the lamination module includes a third carrier frame mounted movable in rotation about the axis of rotation, and which, for each cam, has a second cam path cooperating with the corresponding second profile, and which carries at least one first gear section, for each first gear section, the peeling roll carries a second gear section cooperating with the first gear section, and the lamination module includes at least one third spring element which is mounted between the second carrier frame and the third carrier frame so as to raise said third carrier frame, where, in the first direction, the or each second profile cooperates with a second cam track to lower the third frame carrier and by cooperation between the gear sections move the peeling roll into the constraint position, and where, in the second direction, the or each second profile cooperates with the second cam track to release the third carrier frame and by cooperation between the gear sections move the peeling roll to the release position.

Advantageously, the third carrier frame carries a compression roll downstream of the heating roll, and the lamination module includes a compression anvil roll which faces the compression roll so that the plastic card is pinched between the compression roll and the compression anvil roll when the third carrier frame is lowered.

The invention also proposes a card processing machine including a feeding system for feeding the card processing machine with plastic cards to be processed, an ejection system which ejects each processed plastic card from the processing machine, and between the feeding system and the ejection system, a lamination module according to one of the preceding variants.

BRIEF DESCRIPTION OF THE DRAWINGS

The above-mentioned features of the invention, as well as others, will appear more clearly upon reading the following description of one embodiment, said description being made with reference to the appended drawings, wherein.

DETAILED DISCLOSURE OF SOME EMBODIMENTS

Figure 1:
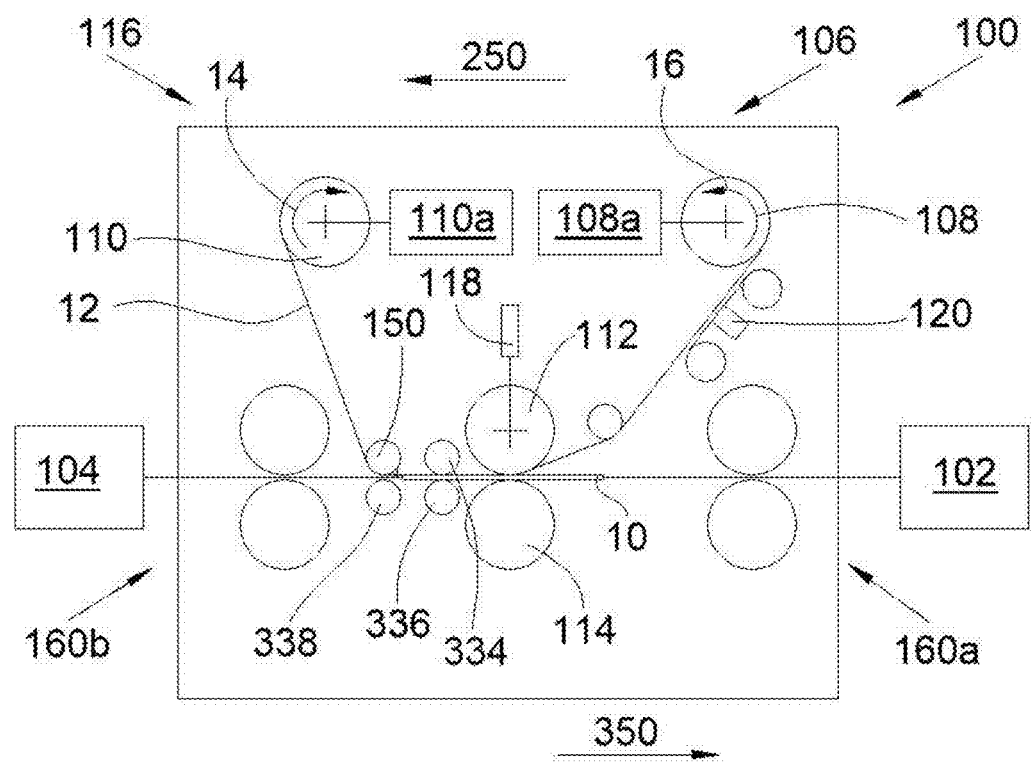
FIG. 1 is a schematic illustration of a processing machine according to the invention.

FIG. 1 shows a processing machine 100 which is used in the context of covering a plastic card 10 with a product with ink and varnish. The processing machine 100 is of the thermal transfer type and it includes:

a feeding system 102 which allows feeding the processing machine 100 with plastic cards 10 to be processed, this feeding system 102 may be a card-by-card feeding system or a reservoir of several cards equipped with a card separation system, an ejection system 104 which allows ejecting each processed plastic card 10 from the processing machine 100 after deposition of the product, a printing module 120, and between the feeding system 102 and the ejection system 104, a lamination module 106 according to the invention which is intended to deposit the product over the plastic card 10.

The feeding system 102 and the ejection system 104 are not described further, because all types of known systems using motorized drive rolls can be used. The printing module 120 is schematically shown and it is also in the form of any type of printing module known to a person skilled in the art. The printing module 120 ensures the transfer of ink areas onto the varnish of a transfer film 12. The movement of the plastic card 10 is herein generally horizontal in the lamination module 106.

Figure 2:
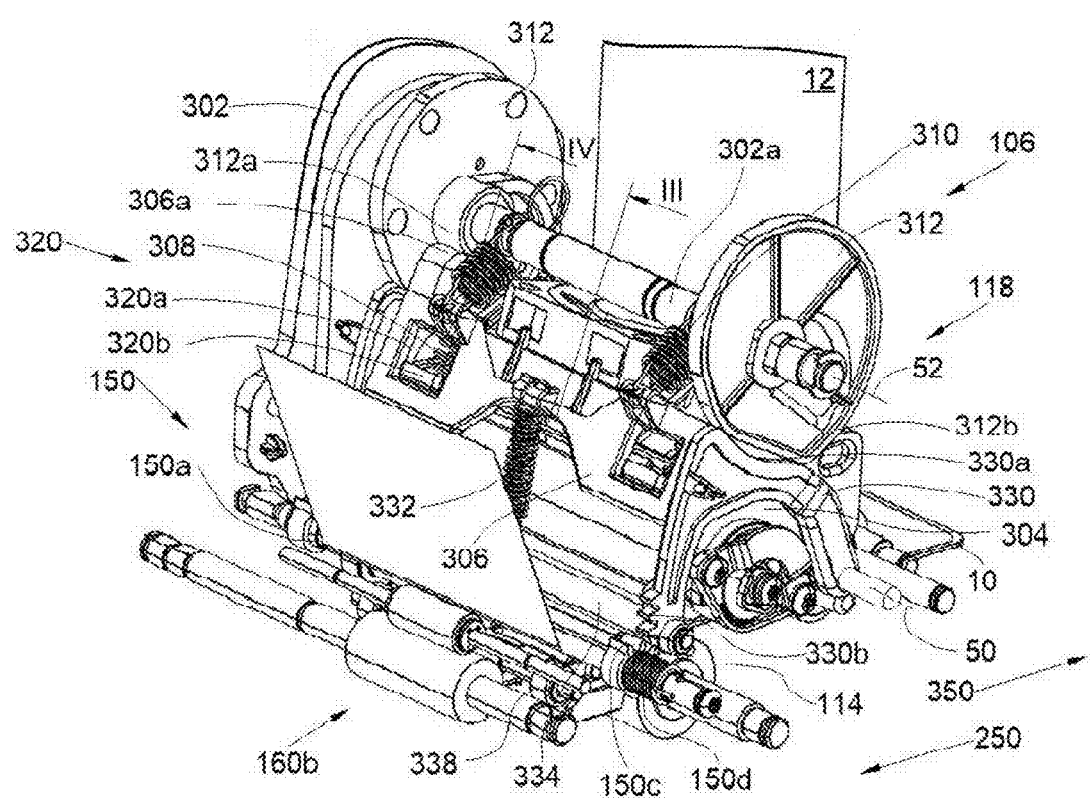
FIG. 2 is a perspective view of a lamination module according to the invention.
Figure 3:
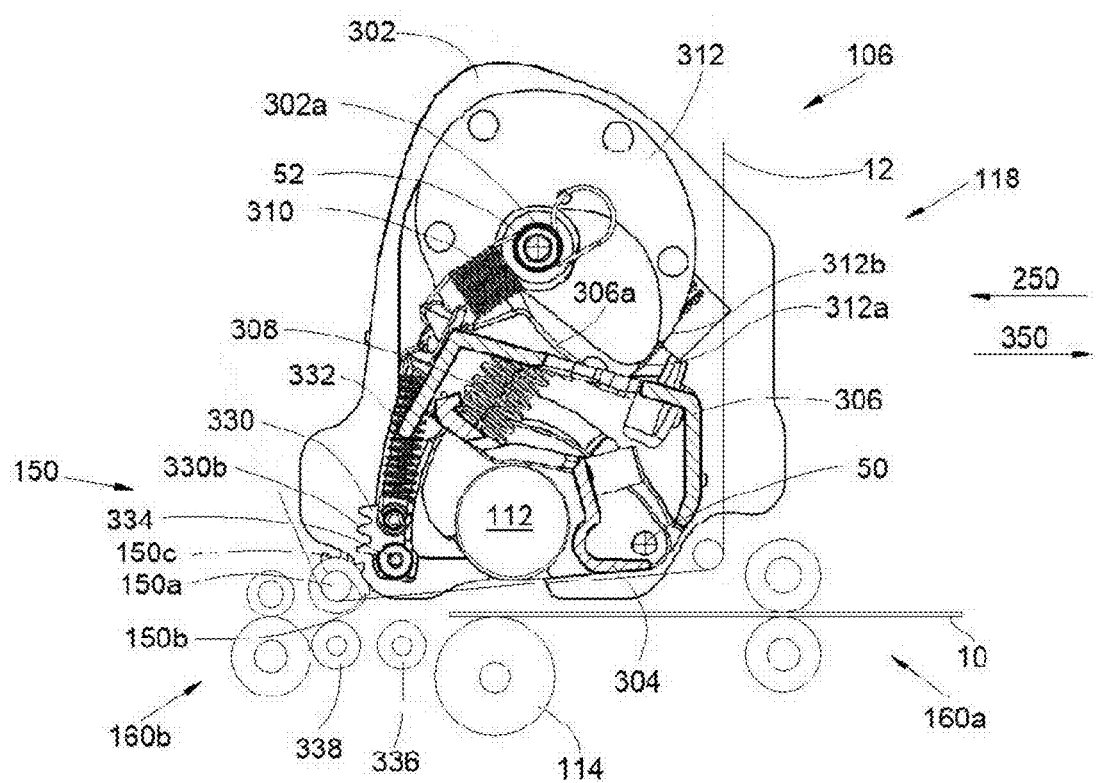
FIG. 3 is a side view in section through a vertical plane of the lamination module of FIG. 2 at the level of the marking III.
Figure 4:
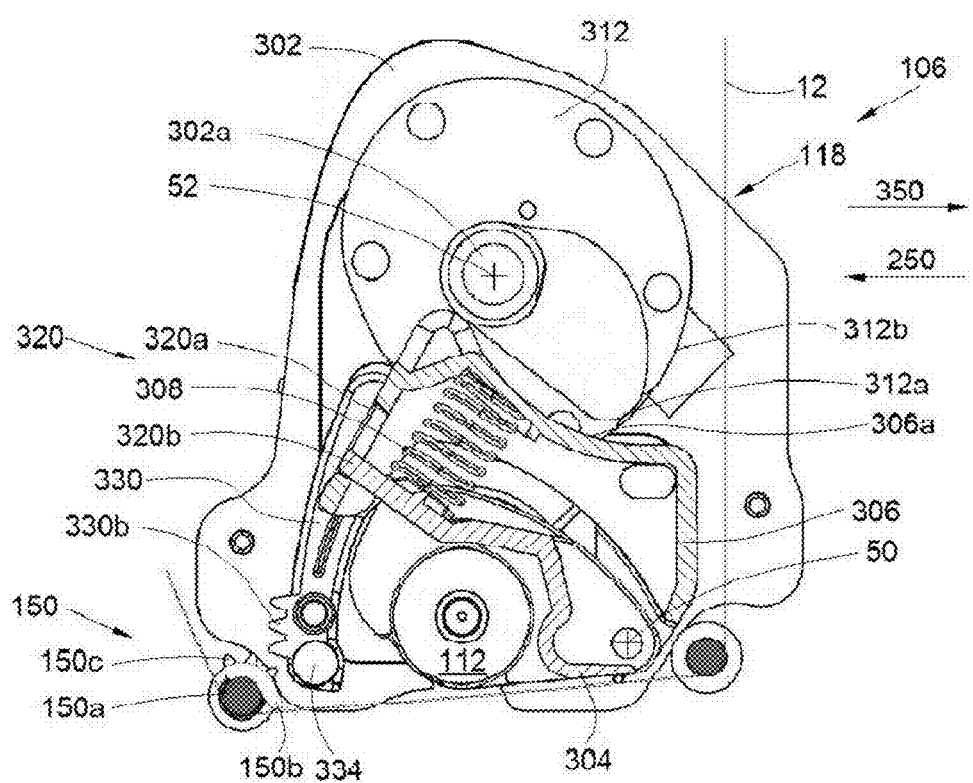
FIG. 4 is a side view in section through a vertical plane of the lamination module of FIG. 2 at the level of the marking IV.
Figure 5:
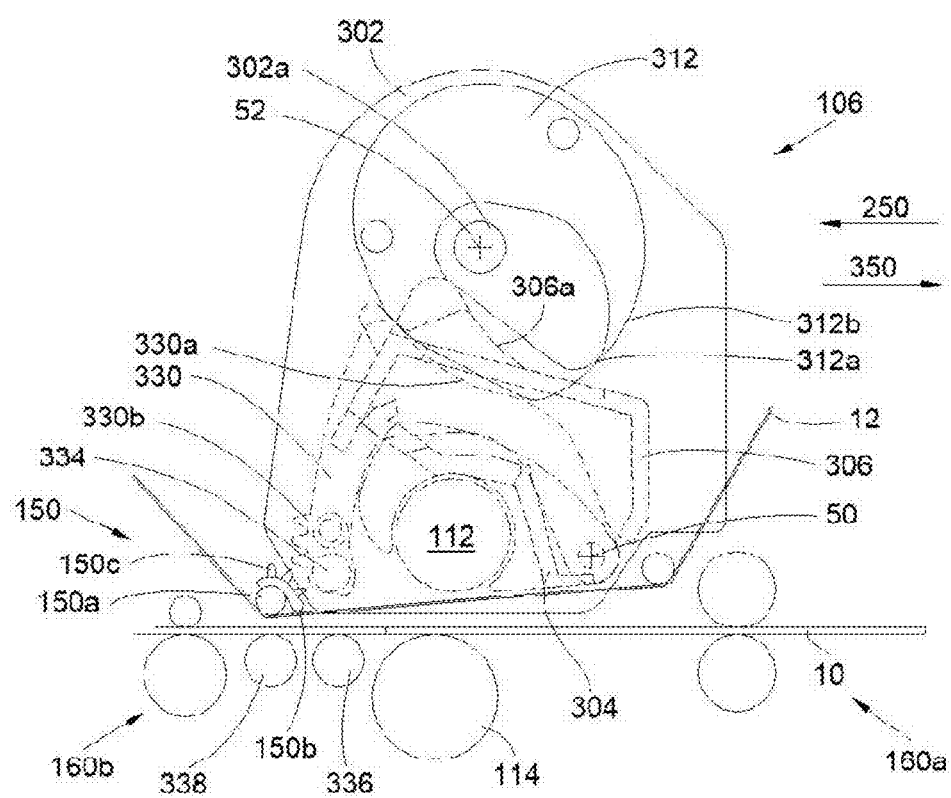
FIG. 5 is a side view of the lamination module of FIG. 2 in the raised position.
Figure 6:
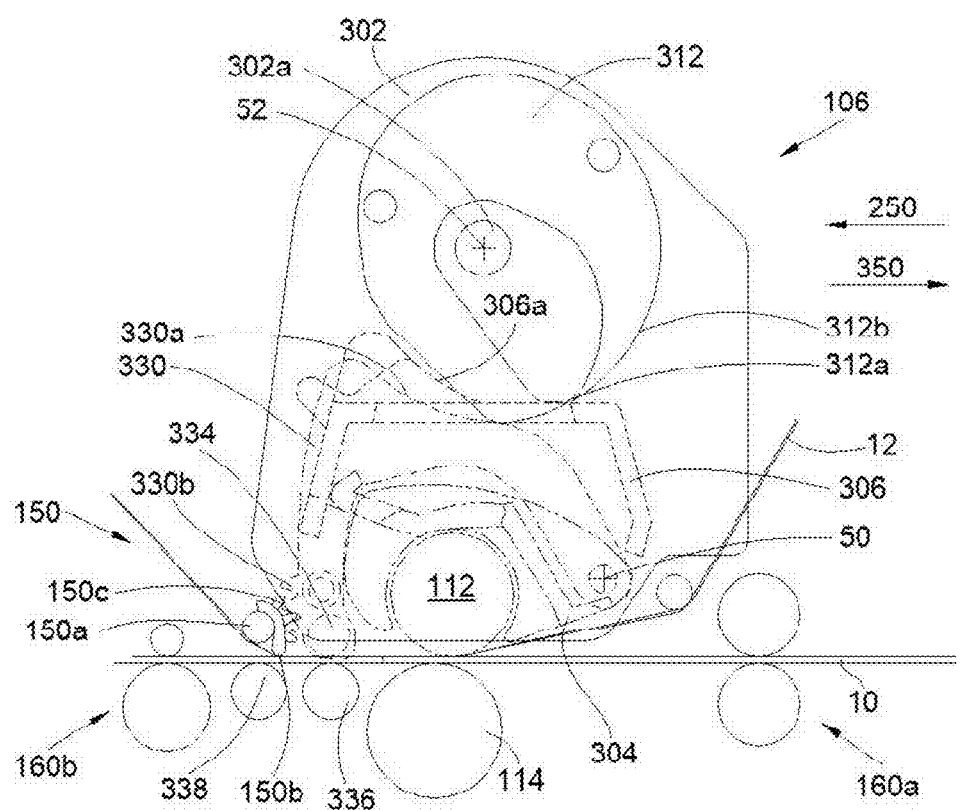
FIG. 6 is a side view of the lamination module of FIG. 2 in the lowered position.

FIG. 2 shows a particular embodiment of the lamination module 106 and FIGS. 3 and 4 show sections of the lamination module 106 at different levels. FIGS. 5 and 6 show sections of the lamination module 106 in two operating positions.

The lamination module 106 includes a frame 302 which is secured to a main frame of the processing machine 100, and which may be a portion of the main frame of the processing machine 100 or an attached and fastened element. The frame 302 is herein in the form of two vertical walls opposite one another, but only one is visible in FIG. 2.

The lamination module 106 includes a heating roll 112 mounted movable in rotation on the frame 302. The heating roll 112 heats over its entire length. For example, heating of the heating roll 112 is carried out by a resistance embedded in the heating roll 112 and controlled by a control unit.

The lamination module 106 also includes two movement systems 160a-b arranged so as to move a plastic card 10 relative to the heating roll 112 according to a so-called lamination direction 250 which goes from the feeding system 102 to the ejection system 104 throughout the lamination module 106. All the rolls described hereinabove and hereinbelow have their axes parallel to one another and perpendicular to the lamination direction 250 and they extend between the walls forming the frame 302 where they are mounted movable in rotation.

In the embodiment of the invention presented herein, there is a movement system 160a upstream of the heating roll 112 with respect to the lamination direction 250 and a movement system 160b downstream of the heating roll 112 with respect to the lamination direction 250. Each movement system 160a-b is herein in the form of a pair of rolls where each roll is mounted movable in rotation on the frame 302, where there is a roll bearing against the upper face of the plastic card 10 and a roll bearing against the underside of the plastic card 10. At least one roll of each pair is equipped with a motor intended to drive said roll. These or some of these rolls may form part of the feeding system 102 and the ejection system 104 depending on their positions with respect to the heating roll 112.

The lamination module 106 also includes an anvil roll 114 mounted movable in rotation on the frame 302 and arranged against the heating roll 112 and arranged so as to ensure pinching of the plastic card 10 between said anvil roll 114 and the heating roll 112, and thus to press the plastic card 10 against the heating roll 112. In the embodiment of the invention presented herein, the anvil roll 114 is equipped with a motor which drives the anvil roll 114 in rotation to drive the plastic card 10 in the lamination direction 250.

The lamination module 106 also includes a feeding and recovery system 116 which is arranged so as to move the transfer film 12 between the plastic card 10 and the heating roll 112 according to the lamination direction 250.

The transfer film 12 is in the form of a strip covered with varnish and including areas covered with ink and as specified above, the ink areas have been deposited on the varnish of the transfer film 12 by the printing module 120. The ink and the varnish are intended to be deposited over the plastic card 10.

When the ink areas and the varnish should be deposited over the plastic card 10, the heating roll 112 heats and the heat and the pressure exerted between the heating roll 112 and the anvil roll 114 ensure the transfer of the ink and of the varnish onto the plastic card 10 at the heating points. The varnish then covers the ink and the plastic card 10.

The feeding and recovery system 116 herein includes a feeding roll 108 on which the transfer film 12 is wound and a recovery roll 110 on which the transfer film 12 is wound after the product (ink and varnish) has been deposited over the plastic card 10. On the path followed by the transfer film 12, the heating roll 112 is arranged between the feeding roll 108 and the recovery roll 110.

To ensure winding of the transfer film 12 on a recovery roll 110, said recovery roll 110 is driven in rotation by a motor 110a. Thus, driving of the transfer film 12 during deposition is performed by the motor 110a which drives the recovery roll 110 in a direction 14 of winding the transfer film 10 on the recovery roll 110.

The operation of the lamination module 106 includes receiving a plastic card 10 from the feeding system 102. This plastic card 10 is handled by the movement systems 160a-b, and in particular the movement system 160a upstream of the heating roll 112 which moves the plastic card 10 between the heating roll 112 and the anvil roll 114 with the transfer film 12 between the heating roll 112 and the plastic card 10. At the same time as the plastic card 10 moves towards the movement system 160b downstream of the heating roll 112, the feeding and recovery system 116 moves the transfer film 12 loaded with the ink areas to be deposited which thus follows the plastic card 10. After passage of the plastic card 10 under the heating roll 112, the movement system 160b downstream of the heating roll 112 takes over the plastic card 10 and sends it towards the ejection system 104. When the plastic card 10 passes under the heating roll 112, the latter heats up to transfer the product from the transfer film 12 onto the plastic card 10.

Downstream of the heating roll 112, the transfer film 12 adheres to the plastic card 10 due to the heat and the pressure, and to more easily peel the transfer film 12 from the plastic card 10, the lamination module 106 includes a peeling system 150 which is arranged downstream of the heating roll 112 with respect to the lamination direction 250. The peeling system 150 includes a peeling roll 150a and a wedge 150b secured to the peeling roll 150a and extending along said peeling roll 150a. The wedge 150b is arranged so as to be positioned between the heating roll 112 and the peeling roll 150a. The wedge 150b extends at least over the width of the plastic card 10, i.e., the dimension of the plastic card 10 that is perpendicular to the lamination direction 250.

The peeling roll 150a is movably mounted on the frame 302 between a constraint position in which the wedge 150b pinches the transfer film 12 against the plastic card 10 and a release position in which the wedge 150b does not pinch the transfer film 12 against the plastic card 10. The peeling roll 150a serves as a guide for the transfer film 12 by ensuring a change of direction towards the recovery roll 110.

Thus, the transfer film 12 passes between the peeling roll 150a and the plastic card 10 without being clamped therebetween.

FIG. 5 shows the lamination module 106 when the peeling roll 150a is in the release position and FIG. 6 shows the lamination module 106 when the peeling roll 150a is in the constraint position. In the release position, the wedge 150b is at a distance from the plastic card 10 and therefore does not compress the transfer film 12 against the plastic card 10. In the constraint position, the wedge 150b presses against the transfer film 12 and the plastic card 10. The scraper-type wedge shape of the wedge 150b creates a pinching force at a pinch line on the transfer film 12, which facilitates peeling of said transfer film 12.

The movement of the peeling roll 150a between the release position and the constraint position and vice versa is herein a rotation about its axis relative to the frame 302, and the movement is ensured by a drive system, such as a motor which is controlled by the control unit and which is arranged so as to move the peeling roll 150a from the release position to the constraint position and vice versa.

In some processing machines 100, for double-sided printing, the plastic card 10 should pass under the heating roll 112. To do so, the movement systems 160a-b should be arranged so as to move the card in the lamination direction 250 and in a reverse direction 350 which therefore goes from the ejection system 104 to the feeding system 102. To do so, the direction of rotation of each motor of the movement systems 160a-b can be reversed to change the direction of rotation and therefore the direction of movement of the plastic card 10.

The passage of the peeling roll 150a from the constraint position into the release position allows clearing the passage for the plastic card 10 and thus avoiding the wedge 150b forming an obstacle to the passage of the plastic card 10. In the release position, the wedge 150b is thus not in the passage of the plastic card 10 and in the constraint position, the wedge 150b is thus in the passage of the plastic card 10 to peel the transfer film 12, and it is moved to the constraint position at the beginning of the plastic card 10.

To relieve the pressure on the plastic card 10 at the level of the heating roll 112, for example to ensure a passage of the plastic card 10 without printing or to facilitate its return in the opposite direction 350 where necessary, the lamination module 106 is equipped with a lifting system 118 which ensures the movement of the heating roll 112 alternately from a lowered position (FIG. 6) corresponding to the position where the heating roll 112 bears against the anvil roll 114 and a raised position (FIG. 5) where the heating roll 112 is at a distance from the anvil roll 114. In the embodiment of the invention presented herein, the lifting system 118 includes a first carrier frame 304 mounted movable in rotation on the frame 302 about an axis of rotation 50 perpendicular to the lamination direction 250 and where the heating roll 112 is secured to the first carrier frame 304.

The lifting system 118 also includes a second carrier frame 306 also mounted movable in rotation on the frame 302 about the axis of rotation 50. The second carrier frame 306 is herein above the first carrier frame 304.

The lifting system 118 also includes at least one first spring element 308 which is mounted between the first carrier frame 304 and the second carrier frame 306 so as to separate them from each other, by pushing them back. Each first spring element 308 is herein a compression spring.

To limit the spacing between the first carrier frame 304 and the second carrier frame 306, the lifting system 118 includes at least one blocking means 320 (herein two in number) which prevents the first carrier frame 304 from separating more than a maximum distance from the second carrier frame 306. Each blocking means 320 is herein in the form of a window 320a formed in the second carrier frame 306 and of a finger 320b inserted into said window 320a and secured to the first carrier frame 304. Thus, the movement of the finger 320b is limited by the edges of the window 320a.

The lifting system 118 also includes at least a second spring element 310 which is mounted between the frame 302, herein via a shaft 302a, and the second carrier frame 306 so as to raise said second carrier frame 306. Each second spring element 310 is herein a tension spring.

The lifting system 118 also includes at least one cam 312 mounted movable in rotation on the frame 302 about a cam axis 52 parallel to the axis of rotation 50, where the cam 312 has a first profile 312a. For each cam 312, the second carrier frame 306 has a first cam track 306a which cooperates with the first profile 312a. The cam 312 is herein mounted secured to the shaft 302a.

For balance-related reasons, there is a first spring element 308 at each end of the first carrier frame 304, there is a second spring element 310 at each end of the second carrier frame 306 and there are two cams 312 at each end of the second carrier frame 306 which then includes a first cam track 306a for each cam 312.

The lifting system 118 also includes a drive means, such as a motor, which is arranged so as to move the or each cam 312 in rotation about the cam axis 52. When the cam(s) 312 rotate(s) in a first direction, each first profile 312a cooperates with a first cam track 306a to lower the second carrier frame 306 and, due to the presence of the first spring elements 308, the first carrier frame 304 and therefore the heating roll 112 against the anvil roll 114. Conversely, the rotation of the cam(s) 312 in a second direction opposite to the first direction, each first profile 312a cooperates with the first cam track 306a to release the second carrier frame 306 which, due to the presence of the second spring elements 310, is raised while driving the first carrier frame 304 and therefore the heating roll 112 which moves away from the anvil roll 114. The first spring elements 308 also act as shock absorbers when the heating roll 112 rises upon passage of a plastic card 10.

In the embodiment of the invention presented herein, the lamination module 106 also includes a third carrier frame 330 which is mounted movable in rotation on the frame 302 about the axis of rotation 50, and which, for each cam 312, has a second cam path 330a and each cam 312 has a second profile 312b which cooperates with a second cam path 330a. The third carrier frame 330 also carries at least one first gear section 330b, herein two in number, namely one at each end of the third carrier frame 330. For each first gear section 330b, the peeling system 150 includes a second gear section 150c cooperating with the first gear section 330b. Each second gear section 150c is secured to the peeling roll 150a. Each gear section 150c, 330b herein includes three teeth, but, depending on the desired angle of rotation, a different number of teeth is possible.

The lamination module 106 also includes at least one third spring element 332 which is mounted between the second carrier frame 306 and the third carrier frame 330 so as to raise said third carrier frame 330. In this case, there is one single third spring element 332 arranged at a midplane of the lamination module 106 and which herein is a tension spring.

When the cam(s) 312 rotate(s) in the first direction, each second profile 312b cooperates with a second cam path 330a to lower the third carrier frame 330 and, due to the cooperation between the gear sections 150c and 330b, the peeling roll 150a pivots on its axis so as to bring the wedge 150b into the constraint position. Conversely, the rotation of the cam(s) 312 in the second direction, each second profile 312b cooperates with the second cam path 330a to release the third carrier frame 330 which, due to the presence of the third spring element 332 is raised with each first gear section 330b and, due to the cooperation between the gear sections 150c and 330b, the peeling roll 150a pivots on its axis so as to bring the wedge 150b into the release position.

When the cam 312 rotates, the heating roll 112 is thus moved from the raised position to the lowered position and vice versa, and, at the same time, the peeling roll 150a is moved from the release position to the constraint position and vice versa. The drive system which moves the peeling roll 150a is thus made up, inter alia, of cams 312, of the drive means which moves the cams 312, and of the third carrier frame 330.

To improve the return of the peeling roll 150a into the release position when it rotates, the peeling system 150 includes a return spring 150d which tends to return the peeling roll 150a from the constraint position to the release position when the peeling roll 150a is brought away from the release position. The return spring 150d is herein a torsion spring mounted between the peeling roll 150a and the frame 302.

In the embodiment of the invention presented herein, the lamination module 106 includes a peeling anvil roll 338 which faces the peeling roll 150a against the lower face of the plastic card 10 so that the plastic card 10 is pinched between the peeling anvil roll 338 and the wedge 150b when the peeling roll 150a is in the constraint position.

In the embodiment of the invention presented herein, the third carrier frame 330 also carries a compression roll 334 which is downstream of the heating roll 112 and which bears against the upper face of the plastic card 10 when the third carrier frame 330 is lowered. The lamination module 106 also includes a compression anvil roll 336 which faces the compression roll 334 against the underside of the plastic card 10 so that the plastic card 10 is pinched between the compression roll 334 and the compression anvil roll 336 when the third carrier frame 330 is lowered. This pinching ensures a pressure force which clamps the transfer film 12 against the plastic card 10 for a better application of the product.

To visualize the different elements of the lamination module in FIGS. 5 and 6, the heating roll 112 and the first carrier frame 304 are shown in ghost lines, the second carrier frame 306 is shown in dotted lines, and the third carrier frame 330 is shown in chain lines. When the second carrier frame 306 and the third carrier frame 330 are raised, each cam 312 forms a stop against which the second carrier frame 306 and the third carrier frame 330 bear to stop their upward movements.

Each motor driving a roll or a cam is controlled by the control unit. According to a particular embodiment, the control unit includes, connected by a communication bus: a processor or CPU ("Central Processing Unit"); a random-access memory or RAM ("Read-Only Memory"); a read only memory, for example of the ROM type ("Read Only Memory") or EEPROM ("Electrically-Erasable Programmable ROM") or of the Flash type; a storage unit, such as an HDD hard disk type storage medium ("Hard Disk Drive"), or a storage medium reader, such as an SD card reader ("Secure Digital"); and an I/O input/output interface manager. The I/O input/output manager enables the control unit to interact with the different motors. The processor is capable of executing instructions loaded into the random-access memory from read-only memory, an external memory, a storage medium (such as an SD card), or a communication network (not shown). When the human-machine interface is powered on, the processor is able to read instructions from the random-access memory and execute them. These instructions form a computer program causing the processor to implement the above-described operating steps. Thus, all or part of the steps and algorithms described herein can be implemented in software form by execution of a set of instructions by a programmable machine, for example a DSP type processor ("Digital Signal Processor") or a microcontroller, or be implemented in hardware form by a machine or a dedicated electronic component ("chip") or a set of dedicated electronic components ("chipset"), for example an FPGA component ("Field Programmable Gate Array") or ASIC ("Application Specific Integrated Circuit"). In general, the controller CTRL 700 includes electronic circuitry adapted and configured to implement the steps and algorithms described herein.

The invention claimed is:

1. A lamination module for a plastic card processing machine, the lamination module comprising:
    a frame;
    a movement system arranged so as to move a plastic card according to a lamination direction;
    a heating roll;
    an anvil roll arranged so as to ensure pinching of a plastic card between the anvil roll and the heating roll;
    a transfer film including areas covered with a product to be deposited over the plastic card;
    a feeding and recovery system arranged so as to move the transfer film between the plastic card and the heating roll;
    a peeling system arranged downstream of the heating roll in the lamination direction and including a peeling roll and a wedge secured to the peeling roll and extending along the peeling roll, wherein the wedge is between the heating roll and the peeling roll in the lamination direction, and wherein the peeling roll is movable between a constraint position in which the wedge pinches the transfer film against the plastic card and a release position in which the wedge does not pinch the transfer film against the plastic card; and
    a drive system arranged so as to move the peeling roll from the release position into the constraint position and vice versa.

2. The lamination module according to claim 1, wherein movement of the peeling roll between the release position and the constraint position is a rotation about an axis of the peeling roll.

3. The lamination module according to claim 2, wherein the peeling system includes a return spring biased to return the peeling roll from the constraint position to the release position when the peeling roll is brought away from the release position.

4. The lamination module according to claim 1, further comprising a peeling anvil roll which faces the peeling roll so that the plastic card is pinched between the peeling anvil roll and the wedge when the peeling roll is in the constraint position.

5. The lamination module according to claim 1, further comprising a lifting system configured to move the heating roll alternately between a lowered position in which the heating roll bears against the anvil roll and a raised position in which the heating roll is spaced apart from the anvil roll.

6. The lamination module according to claim 5, wherein the lifting system comprises:
    a first carrier frame mounted movable in rotation about an axis of rotation;
    a second carrier frame mounted movable in rotation about the axis of rotation;
    at least one first spring element mounted between the first carrier frame and the second carrier frame so as to space them apart from one another;
    at least one second spring element mounted between the frame and the second carrier frame for raising the second carrier frame;
    a cam mounted movable in rotation about a cam axis parallel to the axis of rotation, wherein the cam has a first profile, and wherein the second carrier frame has a first cam track; and
    a drive means arranged so as to move the cam in rotation about the cam axis, wherein, in a first direction of rotation of the cam, the first profile cooperates with the first cam track to lower the second carrier frame and wherein, in a second direction of rotation of the cam, the first profile cooperates with the first cam track to release the second carrier frame.

7. The lamination module according to claim 6, wherein:
    the cam has a second profile;
    the lamination module includes a third carrier frame mounted movable in rotation about the axis of rotation, the third carrier frame having a second cam track cooperating with the second profile, and the third carrier frame having a first gear section;
    the peeling roll has a second gear section cooperating with the first gear section;
    the lamination module includes at least one third spring element which is mounted between the second carrier frame and the third carrier frame for raising the third carrier frame; and
    in the first direction, the second profile cooperates with the second cam track to lower the third carrier frame, and by cooperation between the first and second gear sections, move the peeling roll into the constraint position, and, in the second direction, the second profile cooperates with the second cam track to release the third carrier frame, and by cooperation between the first and second gear sections, move the peeling roll into the release position.

8. The lamination module according to claim 7, wherein the third carrier frame carries a compression roll downstream of the heating roll in the lamination direction, and the lamination module includes a compression anvil roll which faces the compression roll so that the plastic card is pinched between the compression roll and the compression anvil roll when the third carrier frame is lowered.

9. A card processing machine including a feeding system for feeding the card processing machine with plastic cards to be processed, an ejection system which ejects each processed plastic card from the processing machine, and between the feeding system and the ejection system, a lamination module according to claim 1.

* * * * *